Dec. 8, 1925.                                      1,565,211
B. F. SEYMOUR
SHAFT COUPLING AND RESILIENT SUSPENSION
Filed Sept. 23, 1921      2 Sheets-Sheet 2
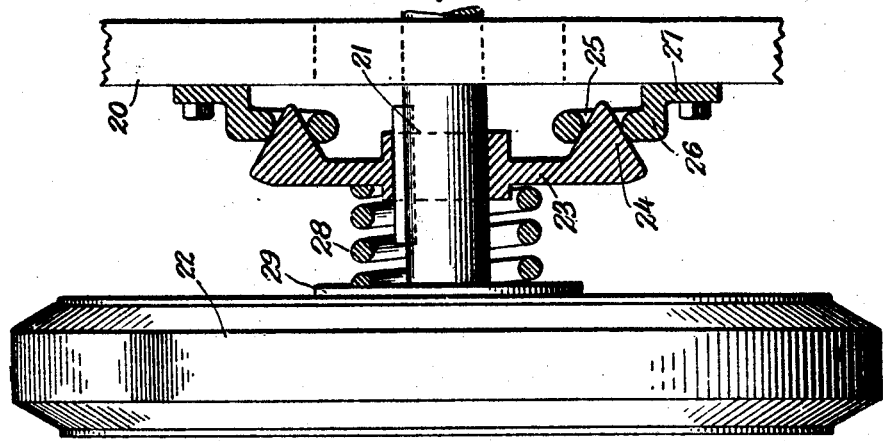
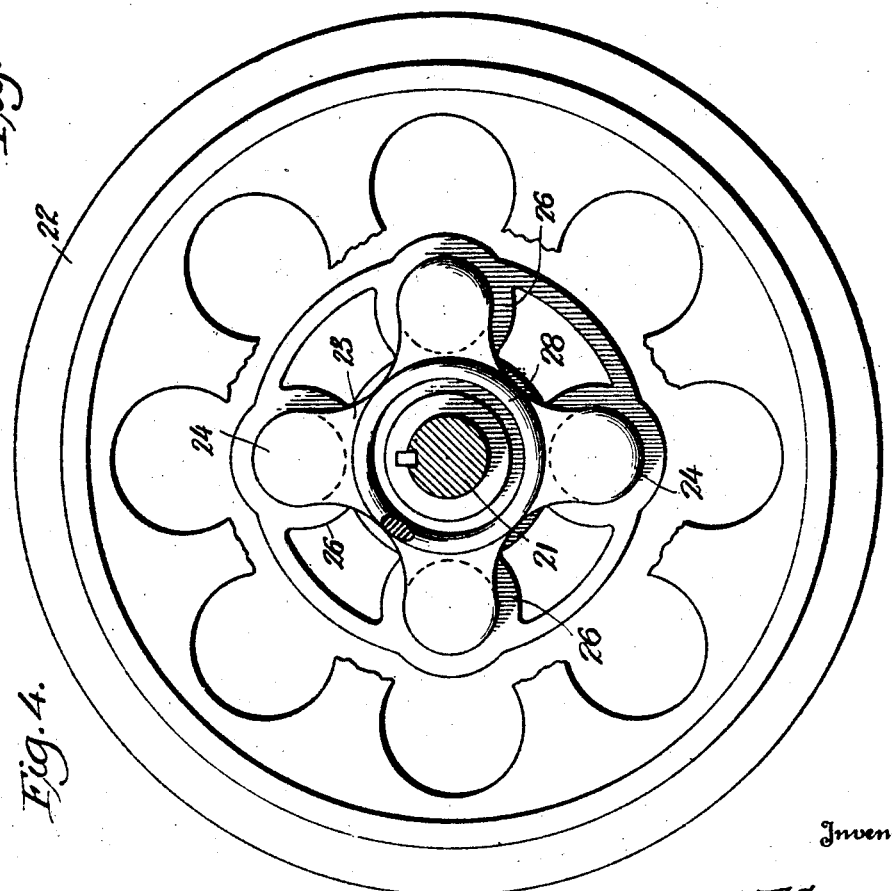
Inventor,
Benjamin F. Seymour,
By
Attorney Patented Dec. 8, 1925.

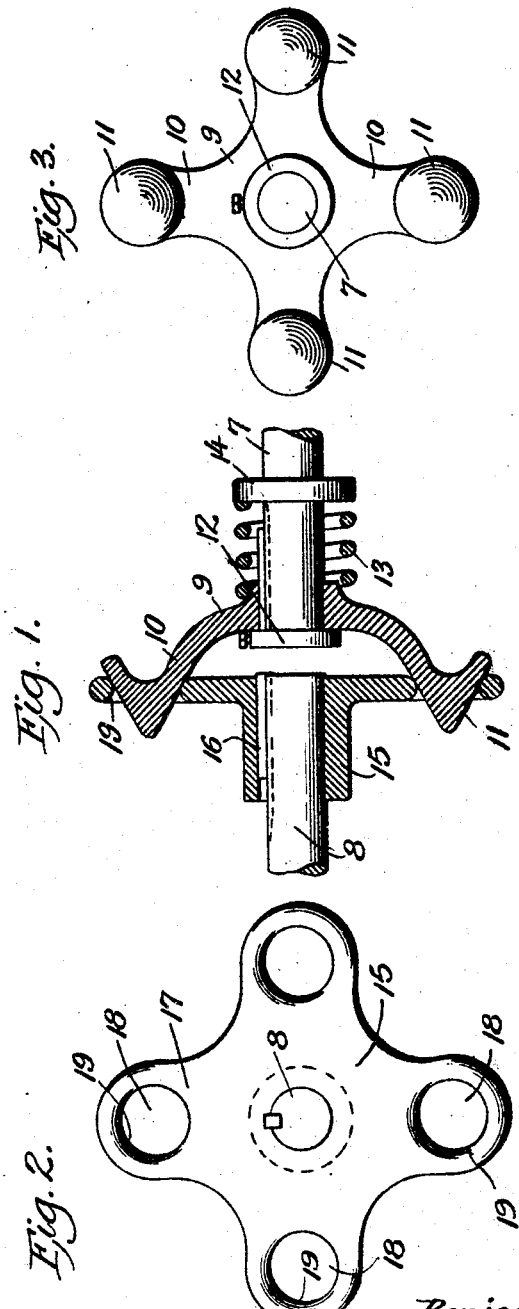

1,565,211

UNITED STATES PATENT OFFICE.

BENJAMIN F. SEYMOUR, OF WASHINGTON, DISTRICT OF COLUMBIA.

SHAFT COUPLING AND RESILIENT SUSPENSION.

Application filed September 23, 1921. Serial No. 502,646.

*To all whom it may concern:*

Be it known that I, BENJAMIN F. SEYMOUR, a citizen of the United States, residing at Washington, in the District of Columbia, have invented certain new and useful Improvements in Shaft Couplings and Resilient Suspensions, of which the following is a specification.

The present invention relates to flexible shaft coupling and resilient suspensions, and consists in the combinations and arrangements of elements hereinafter described and particularly set forth in the accompanying claims.

The purpose of the invention is to provide a flexible coupling between a driving and a driven element adapted to positively transmit the driving force, whether said elements are in or out of axial alinement or in relatively angular relation, and one which will readily accommodate itself under all normal working conditions to which the shafts would be subjected.

A further purpose of the invention is to provide a resilient suspension for mobile bodies, especially bodies of vehicles of the motor driven type operable to absorb and dissipate all shocks or jars to which said body is subjected and without causing undue strain or transmitting excessive vibration to the body supported.

Another object of the resilient suspension as proposed herein is the employment of apparatus and disposal of the elements thereof in such a manner as will secure the maximum stability of the resilient sustaining structure and equitable location or distribution of the resilient devices per se with regard to the chassis or frame on which the same are mounted.

The invention is disclosed by way of illustration in the accompanying drawings, wherein:—

Figure 1 is a transverse sectional view of the coupling device per se;

Figure 2, a front elevational view of one of the coupling elements;

Figure 3, a similar view of the other coupling element;

Figure 4, a front elevational view showing the device applied as a suspension for vehicle bodies; and Figure 5 is a transverse sectional view of the same.

Referring to the construction in further detail and wherein like reference characters designate corresponding parts in the different views shown, the construction comprises a driving element or shaft 7 adapted to be connected to drive the driven element or shaft 8 through the medium of the coupling device, as shown in Figure 1.

The driving shaft 7 has a member 9 splined thereon which is provided with a plurality of radially disposed arms 10, each formed with a cone element 11, and said member 9 is normally held tensioned against the collar 12 secured to the end of the shaft 7 through the medium of a spring 13 seating against the collar 14 fixed on said shaft, as shown.

A member 15 is keyed, as at 16, on the shaft 8 and is provided with a plurality of radially disposed portions 17 having recesses 18 whose surfaces 19 are formed angular or complementary to the surfaces of the several cone heads 11 with which they coact in the manner shown.

It will therefore be seen from the foregoing that any rotary motion imparted to the shaft 7 will effect a positive and like turning of the shaft 8, and that this transmission from the shaft 7 to shaft 8 will occur whether the shafts 7 and 8 be in or out of axial alinement or in relatively angular relation; i. e., the coupling elements will be held to cooperate within the range of limits allowed by the resilient mounting of the cone carrying member and the manner of engagement between the cone heads and their respective engaging recesses.

In the arrangement shown in Figures 4 and 5, the device is employed as a resilient suspension for vehicle bodies, and in this disclosure 20 represents the chassis or frame of the vehicle having the usual axle 21 mounted on the wheel 22. The cone carrying member 23 is splined on the axle 21 and has the several cone elements 24 engaging within the recesses 25 formed in lugs 26 of the ring 27 that is secured to the chassis 20 as shown. A spring 28 is interposed between the hub 29 of the wheel and cone carrying member 23 and functions to hold the cone elements thereof in engagement with the angular surfaces of the recesses 25.

It will therefore be seen that any relative vertical movement between the chassis or frame 20 and the wheel axle will be taken up by the coacting cone elements that have limited relative movement under the tension of the compression spring.

The illustration shows a particular embodiment of the invention, though it is understood, of course, that the invention may be carried out in other ways, and that therefore the present disclosure is to be considered in an illustrative sense only and not as a limiting one.

Having thus described the invention, what is claimed is:

1. In a device of the character described, the combination of a shaft having an element splined thereon provided with a plurality of cone heads, a spring on the shaft normally holding said element under tension, a member having an element provided with a plurality of recesses adapted to receive said cone heads, said element being non-revolubly mounted on said member and providing a resilient connection between said shaft and said member, substantially as set forth.

2. The combination with a pair of co-axial members, an element splined on one of said members and formed with a plurality of cone heads, a second element non-revolubly mounted on the other of said members and provided with a plurality of recesses having cone surfaces adapted to receive said cone heads, and a spring associated with the splined element holding said cone heads in frictional engagement with said recesses, said members being adapted to have relative angular displacement, substantially as set forth.

3. In a resilient suspension, the combination of a body to be supported, a shaft, a member having a plurality of cone heads mounted on the shaft, a member mounted on said body receiving said cone heads, and means, normally holding said cone heads in frictional engagement with their cooperative elements substantially as set forth.

4. In a resilient suspension, the combination of a body to be supported, a shaft, a member having a plurality of cone heads slidably mounted on said shaft, a member mounted on the body having a plurality of recesses receiving said cone heads, and a spring mounted on the shaft normally holding said cone heads in frictional engagement with said recessed member, substantially as set forth.

5. In a resilient suspension, the combination of a body to be supported, a shaft passing therethrough, a member splined on said shaft having a plurality of angularly disposed heads, a member mounted on said body having a plurality of angularly disposed recesses receiving said heads, and a spring mounted on the shaft normally holding said cone heads in frictional engagement with said recessed member, substantially as set forth.

6. In a vehicle body suspension, the combination of an axle having a wheel thereon, a member splined on said axle provided with a plurality of angularly disposed cone elements, a member mounted on the vehicle body having a plurality of recesses formed with cone surfaces and receiving said cone elements, and a spring interposed between the vehicle wheel and said splined member normally holding the cone elements in frictional engagement with said recesses, substantially as set forth.

In testimony whereof I affix my signature.

BENJAMIN F. SEYMOUR.